United States Patent
Dharmapurikar et al.

(10) Patent No.: US 7,444,515 B2
(45) Date of Patent: Oct. 28, 2008

(54) METHOD AND APPARATUS FOR DETECTING PREDEFINED SIGNATURES IN PACKET PAYLOAD USING BLOOM FILTERS

(75) Inventors: Sarang Dharmapurikar, St. Louis, MO (US); Praveen Krishnamurthy, St. Louis, MO (US); Todd Sproull, St. Louis, MO (US); John Lockwood, St. Louis, MO (US)

(73) Assignee: Washington University, St. Louis, MO (US)

( * ) Notice: Subject to any disclaimer, the term of this patent is extended or adjusted under 35 U.S.C. 154(b) by 961 days.

(21) Appl. No.: 10/640,513

(22) Filed: Aug. 14, 2003

(65) Prior Publication Data

US 2005/0086520 A1    Apr. 21, 2005

(51) Int. Cl.
*H04L 9/00* (2006.01)
*G06F 7/04* (2006.01)
*H04K 1/00* (2006.01)

(52) U.S. Cl. .................. 713/176; 713/161; 713/168; 713/180; 713/182; 726/3; 726/27; 380/255

(58) Field of Classification Search .................. 713/176
See application file for complete search history.

(56) References Cited

U.S. PATENT DOCUMENTS

| | | | |
|---|---|---|---|
| 5,701,464 A | 12/1997 | Aucsmith | |
| 5,813,000 A * | 9/1998 | Furlani | ............ 707/3 |
| 5,991,881 A | 11/1999 | Conklin et al. | |
| 6,067,569 A | 5/2000 | Khaki et al. | |
| 6,073,160 A | 6/2000 | Grantham et al. | |
| 6,134,551 A | 10/2000 | Aucsmith | |
| 6,147,976 A | 11/2000 | Shand et al. | |
| 6,169,969 B1 | 1/2001 | Cohen | |
| 6,279,113 B1 | 8/2001 | Vaidya | |
| 6,377,942 B1 | 4/2002 | Hinsley et al. | |
| 6,499,107 B1 | 12/2002 | Gleichauf et al. | |
| 6,804,667 B1 * | 10/2004 | Martin | ............ 707/6 |
| 6,978,223 B2 * | 12/2005 | Milliken | ............ 702/182 |
| 7,167,980 B2 * | 1/2007 | Chiu | ............ 713/160 |
| 2002/0129140 A1 | 9/2002 | Peled et al. | |
| 2002/0162025 A1 | 10/2002 | Sutton et al. | |
| 2002/0166063 A1 | 11/2002 | Lachman, III et al. | |
| 2003/0009693 A1 | 1/2003 | Brock et al. | |

(Continued)

OTHER PUBLICATIONS

Artan et al, Multi-packet Signature Detection using Prefix Bloom Filters, 2005, IEEE, pp. 1811-1816.*

(Continued)

*Primary Examiner*—Ayaz Sheikh
*Assistant Examiner*—Aravind K Moorthy
(74) *Attorney, Agent, or Firm*—Sonnenschein Nath & Rosenthal LLP (57) ABSTRACT

The present invention relates to a method and apparatus based on Bloom filters for detecting predefined signatures (a string of bytes) in a network packet payload. A Bloom filter is a data structure for representing a set of strings in order to support membership queries. Hardware Bloom filters isolate all packets that potentially contain predefined signatures. Another independent process eliminates false positives produced by the Bloom filters. The system is implemented on a FPGA platform, resulting in a set of 10,000 strings being scanned in the network data at the line speed of 2.4 Gbps.

57 Claims, 5 Drawing Sheets

U.S. PATENT DOCUMENTS

| | | | |
|---|---|---|---|
| 2003/0014662 | A1 | 1/2003 | Gupta et al. |
| 2003/0023876 | A1 | 1/2003 | Bardsley et al. |
| 2003/0065943 | A1 | 4/2003 | Geis et al. |
| 2003/0074582 | A1 | 4/2003 | Patel et al. |
| 2003/0110229 | A1 | 6/2003 | Kulig et al. |

OTHER PUBLICATIONS

Yan et al, Enhancing Collaborative Spam Detection with Bloom Filters, 2006, IEEE, pp. 414-425.*

Donnet et al, Retouched Bloom Filters: Allowing Networked Applications to Trade Off Selected False Positives Against False Negatives, 2006, ACM, pp. 1-12.*

Bonomi et al, Beyond Bloom Filters: From Approximate Membership Checks to Approximate State Machines, 2006, ACM, pp. 315-326.*

Hao et al, Building High Accuracy Bloom Filters using Partitioned Hashing, 2007, ACM, pp. 277-287.*

Kaya et al, Increasing the power efficiency of Bloom filters for network string matching, 2006, IEEE, pp. 1828-1831☐☐.*

Artan et al, Multi-packet signature detection using prefix bloom filters, 2005, IEEE, pp. 1811-1816.*

Kefu et al, Fast Dynamic Pattern Matching for Deep Packet Inspection, 2008, IEEE pp. 802-807.*

Burton H. Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Dharmapurikar et al., "Deep Packet Inspection Using Parallel Bloom Filters," Symposium on High Performance Interconnnects (HotI), Stanford, California, 2003, pp. 44-51.

Dharmapurikar et al., "Longest Prefix Matching Using Bloom Filters," SIGCOMM, 2003, pp. 201-212.

* cited by examiner

METHOD AND APPARATUS FOR DETECTING PREDEFINED SIGNATURES IN PACKET PAYLOAD USING BLOOM FILTERS

The present invention relates to a method and apparatus of detecting predefined signatures in a network packet payload using Bloom filters.

BACKGROUND OF THE INVENTION

There is a class of packet processing applications which need to inspect packets on the link deeper than protocol headers and to analyze its payload. For instance, network security applications require that the packets containing certain malicious strings (i.e., internet worms, computer viruses) be dropped. Further, filtering of SPAM and detection of unauthorized transfer of copyrighted material is necessary. See for example, U.S. Patent Publication No. 20030110229 to Kulig et al., which generally describes a system which scans content.

Content-based billing techniques analyze media files and bill the receiver based on the material transferred over the network. Content forwarding applications look at the HTTP headers and direct the requests to predetermined servers for load balancing.

Most payload applications have a common requirement for string matching—see U.S. Pat. No. 6,377,942 to Hinsley et al. and U.S. Pat. No. 6,169,969 to Cohen. Some randomized string matching techniques use Bloom filters (see B. Bloom, in "Space/time trade-offs in hash coding with allowable errors", ACM, 13(7):422-426, May 1970). One such technique has been implemented using a unique platform called Splash 2 (Pryor, D., Thistle, M., & Shirazi, N., "Text Searching On Splash 2", Proceedings of the IEEE Workshop on PRGAs for Custom Computing Machines, Los Alamitos, Calif., IEEE Computer Soc. Press, 1993, pp. 172-177.).

A file can be characterized by the presence of a string of bytes (a string is synonymous with a signature herein), and its transmission across a link can be monitored by looking out for the presence of this string on the network. Since the location of such strings in the packet payload is not deterministic, such applications need the ability to detect strings of different lengths starting at arbitrary locations in the packet payload.

Such packet inspection applications, when deployed at router ports, must be able to operate at wire speeds. With the network speeds doubling every year, it is becoming increasingly difficult for software-based packet monitors to keep up with the line rates. This has underscored the needs for specialized hardware-based solutions which are portable and operate at wire speeds.

SUMMARY OF THE INVENTION

The present invention relates to a method and apparatus of detecting predefined signatures in a network packet payload using Bloom filters.

In one embodiment consistent with the present invention, the method of monitoring signatures in a network packet payload includes monitoring a data stream on the network for a signature of a predetermined length; testing the network signature for membership in one of a plurality of Bloom filters; and testing for a false positive on the membership in the one of the Bloom filters.

Further, in one embodiment consistent with the present invention, each of the Bloom filters contains a predefined signature of a predetermined length.

Still further, in one embodiment consistent with the present invention, the membership includes a correspondence between the network signature and the predefined signatures.

In yet another embodiment consistent with the present invention, a set of multiple mini-Bloom filters are allocated to each Bloom filter, and the predefined signatures are uniformly distributed into the set of mini-Bloom filters.

In another embodiment consistent with the present invention, a method of monitoring signatures in a network packet payload includes storing a predefined signature of a predetermined length in one of a plurality of Bloom filters; monitoring a data stream on the network for a signature which corresponds to the predefined signature; and determining, using an analyzer, whether the network signature one of corresponds to the predefined signature and is a false positive.

In yet another embodiment consistent with the present invention, the apparatus for monitoring signatures in a network packet payload, includes means for monitoring a data stream on the network for a signature of a predetermined length; means for testing the network signature for membership in one of a plurality of Bloom filters; and means for testing for a false positive on the membership in the one of the Bloom filters.

In yet another embodiment consistent with the present invention, the apparatus for monitoring signatures in a network packet payload includes means for storing a predefined signature of a predetermined length in one of a plurality of Bloom filters; means for monitoring a data stream on the network for a signature which corresponds to the predefined signature; and means for determining, using an analyzer, whether the network signature one of corresponds to the predefined signature and is a false positive.

In yet another embodiment consistent with the present invention, an apparatus for monitoring signatures in a packet payload over a network, includes an FPGA having a plurality of embedded block memories used to construct a plurality of Bloom filters, the FPGA being disposed on a platform; a switch which multicasts data from the network to a router; wherein traffic from the network to the router is processed in the FPGA; and a monitor which checks all packets for signatures marked as a possible match by predefined signatures stored in the Bloom filters.

Further, in yet another embodiment consistent with the present invention, the FPGA includes embedded memories, wherein the embedded memories are embedded RAMs in a VLSI chip.

Thus has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE INVENTION

The present invention relates to a hardware-based technique using Bloom filters for detecting predefined signatures (a string of bytes) in a network packet payload without degrading throughput.

A Bloom filter (see B. Bloom, in "Space/time trade-offs in hash coding with allowable errors", ACM, 13(7):422-426, May 1970) is a data structure that stores a set of signatures compactly for computing multiple hash functions on each member of the set. With this randomized technique, a database of strings is queried for the membership of a particular string. Given a string X, the Bloom filter computes k hash functions on the string, producing k hash values ranging each from 1 to m. The Bloom filter then sets k bits in an m-bit long vector at the addresses corresponding to the k hash values. The same procedure is repeated for all the members of the set, and is called "programming" the filter.

The query process is similar to programming, where a string whose membership is to be verified is input to the filter. The Bloom filter generates k hash values using the same hash functions it used to program the filter. The bits in the m-bit long vector at the locations corresponding to the k hash values are looked up. If at least one of these k bits is found not set, then the string is declared to be a non-member of the set. If all the bits are found to be set, then the string is said to belong to the set with a certain probability.

This uncertainty in the membership comes from the fact that those k bits in the m-bit vector can bet set by any of the n members. Thus, finding a bit set does not necessarily imply that it was set by the particular string being queried. However, finding a bit not set certainly implies that the string does not belong to the set, since if it did then all the k bits would definitely have been set when the Bloom filter was programmed with that string.

This explains the presence of false positives in this scheme, and the absence of any false negatives. The false positive rate f, is expressed as $$f=(1-e^{(-nk/m)})^k \qquad (1)$$

where n is the number of strings programmed into the Bloom filter. The value of f can be reduced by choosing appropriate values of m and k for a given size of the member set, n.

It is clear that the value of m needs to be quite large compared to the size of the string set, i.e., n. Also, for a given ratio of m/n, the false probability can be reduced by increasing the number of hash functions k. In the optimal case, when false positive probability is minimized with respect to k, the following relation is achieved:

$$k = \left(\frac{m}{n}\right)\ln 2 \qquad (2)$$

This corresponds to a false positive probability ratio of:

$$f = \left(\frac{1}{2}\right)^k \qquad (3)$$

The ratio m/n can be interpreted as the average number of bits consumed by a single member of the set. It should be noted that this space requirement is independent of the actual size of the member. In the optimal case, the false positive probability decreased exponentially with a linear increase in the ratio m/n. Secondly, this also implies that the number of hash functions k, and hence the number of random lookups in the bit vector required to query one membership is proportional to m/n.

One property of Bloom filters is that it is not possible to delete a member stored into the filter. Deleting a particular entry requires that the corresponding k hashed bits in the bit vector be set to zero. This could disturb other members programmed into the filter which hash to any of these bits.

To overcome this drawback, a Counting Bloom filter maintains a vector of counters corresponding to each bit in the bit-vector. Whenever a member is added to or deleted from the filter, the counters corresponding to the k hash values are incremented or decremented, respectively. When a counter changes from zero to one, the corresponding bit in the bit-vector is set. When a counter changes from one to zero, the corresponding bit in the bit-vector is cleared.

The counters are changed only during addition and deletion of strings in the Bloom filter. For applications like network intrusion detection, these updates are relatively less frequent than the actual query process itself. Hence, counters can be maintained in software and the bit corresponding to each counter is maintained in hardware. Thus, by avoiding counter implementation in hardware, memory resources can be saved.

An important property of Bloom filters is that the computation time involved in performing the query is independent of the size of the set of strings in the database, provided the memory used by the data structure scales linearly with the number of strings stored in it. Further, the amount of storage required by the Bloom filter for each string is independent of its length. Still further, the computation, which requires generation of hash values, can be performed in special purpose hardware.

Figure 1:
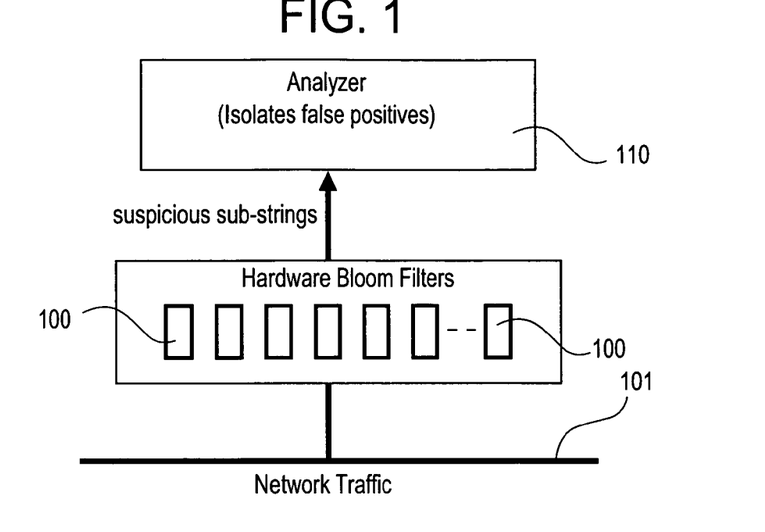
FIG. 1 is a schematic diagram of a plurality of hardware Bloom filters scanning all network traffic on a multi-gigabit network for predefined signatures, according to one embodiment consistent with the present invention.

In one embodiment consistent with the present invention, a predefined set of signatures are grouped according to their length (in bytes) and stored in a set of parallel Bloom filters in hardware. Each of these Bloom filters 100 (see FIG. 1) contains the signatures of a particular length. The Bloom filters 1-n (100) are used to monitor multigigabit network traffic 101 and operate on strings of corresponding length from the network data (see FIG. 1). Each string is tested for its membership in the Bloom filters 100. If a string is found to be a member of any Bloom filter 100, then it is declared as a possible matching signature. Such strings are probed into an analyzer 110, for example, which determines if a string is indeed a member of the set or a false positive. The analyzer 110 is a deterministic string matching algorithm which verifies if the input string is a member of a given set or not. When a string of interest is found, an appropriate action (drop, forward, and log, for example) can be taken on the packet.

Figure 2:
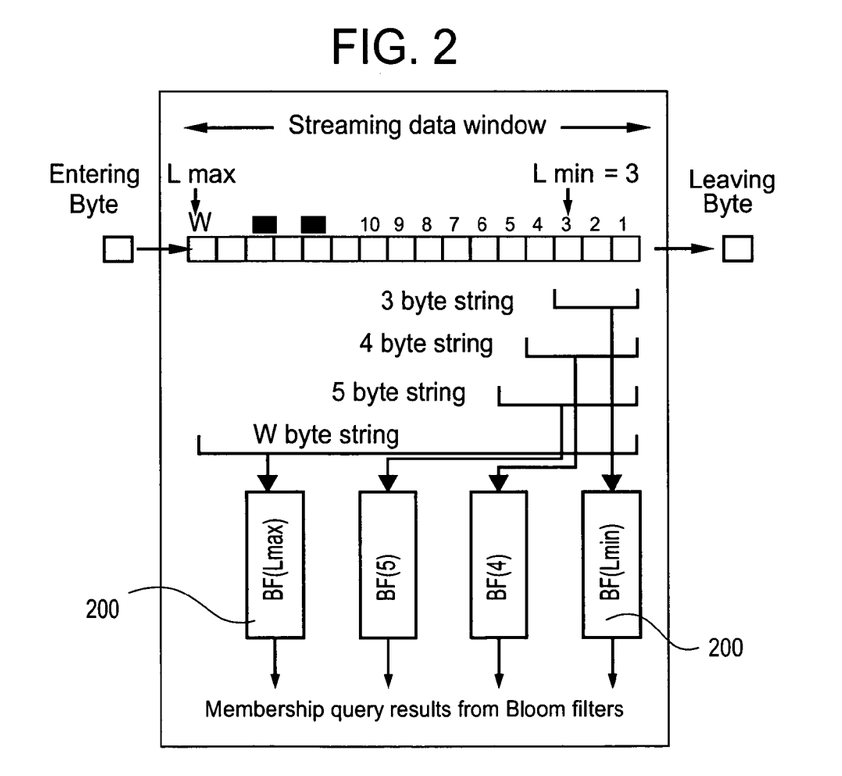
FIG. 2 is a schematic diagram of a window of streaming data containing strings of length $L_{min}=3$ to $L_{max}=W$, where each string is examined by a Bloom filter, according to one embodiment consistent with the present invention.

In one embodiment consistent with the present invention, the Bloom filter engine reads as input a data stream that arrives at the rate of one byte per clock cycle. The length of the signatures range from $L_{min}$ to $L_{max}$, and the Bloom filter engine monitors a window of $L_{max}$ bytes as shown in FIG. 2.

When this window is full, it contains $L_{max}-L_{min}$ different sub-strings which are potential signatures. Membership of each of these sub-strings is verified using the corresponding Bloom filter 200. Each of the hardware Bloom filters 200 in the present invention gives one query result per clock cycle. In this way, memberships of all the $L_{max}-L_{min}$ strings can be verified in a single clock cycle. If none of the sub-strings shows a match, the data stream can be advanced by one byte. By monitoring a window in this way, eventually all the possible strings of length from $L_{min}$ bytes (i.e., 3 bytes) to $L_{max}$ bytes (i.e., W) in every packet are scanned.

In the case of multiple sub-strings matching within a single window, the longest sub-string among them is considered as the string of interest. This policy is called the Longest Substring First (LSF). Thus, in the case of multiple matches at the same time in the array of Bloom filters 200, the analyzer 110 (see FIG. 1) is probed with the longest sub-string down to the shortest sub-string. The search stops as soon as a sub-string is first confirmed by the analyzer 110. After the search is over, the window is advanced by one byte and the same procedure is repeated.

Thus, in the present invention, the Bloom filters 200 accelerate string matching by isolating most of the strings from the network data and processing just those strings to the analyzer which have a very high probability of matching. A string of interest never goes unnoticed since the Bloom filter never gives false negatives. Thus, an expression that gives the statistical throughput of the system can be derived.

Within a window, it is possible that multiple Bloom filters show matches corresponding to their sub-strings. For a search that ends at the $l^{th}$ Bloom filter, let $B_l$ denote the number of Bloom filters which filter for lengths higher than l. The probability that exactly i filters associated with string lengths greater than l will generate false positives is given by:

$$P_l = \binom{B_l}{i} f^i(1-f)^{B_l-i} \quad (4)$$

where f is the false positive probability of each Bloom filter, B is the total number of Bloom filters in the system, and F is the clock frequency (in Hz) at which the system operates.

For each value of i, i additional probes into the analyzer would be required. Hence, the expected number of additional probes in the analyzer that are required can be expressed as:

$$E_l = \sum_{i=1}^{B_l} i \binom{B_l}{i} f^i(1-f)^{B_l-i} \quad (5)$$

which is the mean for a binomial distribution with $B_l$ elements and a probability of success f. Hence, $$E_l = B_l f \quad (6)$$

The equation above shows that the expected number of additional probes into the analyzer, when the search ends at $l^{th}$ Bloom filter, is equal to the number of Bloom filters for the longer string lengths times the false positive probability (which is the same for all the filters). In the worst case, $B_l=B$, hence the value of $E_l$ is upper bounded at Bf. This upper bound on the expected number of additional probes in the analyzer is used for further calculations. Since each of these probes requires time τ, which is the time (in seconds) required to check the presence of a string using the analyzer), in the worst case, the expected additional time spent in probes can be expressed as:

$$T_{add}=Bf\tau \text{ seconds} \quad (7)$$

Since the search ends at Bloom filter l, if it shows a match then it means a true match has been found, otherwise it means there are no Bloom filters for string lengths less than l that show a match in the given window. In the earlier case, again, time τ will be spent to probe the analyzer for the confirmation of true match. In the latter case, time equal to the clock period, (1/F), will be spent. If the frequency of occurrence of a true string in the data stream is denoted by p, then, on an average, the time spent during the end of the search within a window is:

$$T_{end} = p\tau + (1-p)\frac{1}{F} \text{ seconds} \quad (8)$$

Thus, on an average, a total of $T_{add}+T_{end}$ is spent in examining a window, after which the window is advanced by a byte. Hence the throughput of the system, R, can be expressed as:

$$R = \frac{1}{T_{add}+T_{end}} \text{ bytes/s} \quad (9)$$
$$= \frac{1}{Bf\tau + p\tau + (1-p)\frac{1}{F}} \text{ bytes/s}$$

Figure 3:
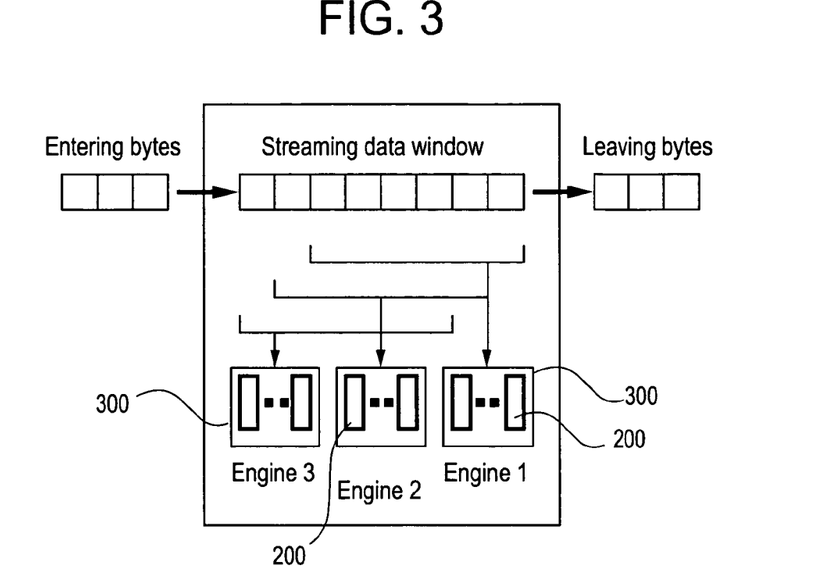
FIG. 3 is a schematic diagram of multiple parallel engines of Bloom filters to obtain better throughput, according to one embodiment consistent with the present invention.

The system as shown in the FIG. 2 processes one byte for every clock cycle. If the set of Bloom filters is grouped in a single scanner engine 300 for example as shown in FIG. 3, then multiple such engines 300 can be instantiated to monitor the data stream starting with an offset of a byte. Thus, if three such engines 300 are used, for example, then the byte stream can be advanced by three bytes at a time, as shown in FIG. 3.

If each of the parallel engines 300 is coupled with an independent analyzer circuit, then the throughput is simply GR. Alternatively, if they share the same analyzer 110 (see FIG. 1) then the throughput expressed in equation (9) needs to be recalculated since there is more contention for accessing the analyzer 110. In this case, the throughput, becomes:

$$R_G = \frac{G}{GT_{add} + T_{end}} \text{ bytes/s} \qquad (10)$$

$$= \frac{G}{GBf\tau + p\tau + (1-p)\frac{1}{F}} \text{ bytes/s}$$

with the assumption that only one of the G engines finds a true match in a given window.

Equation (10) can be simplified by considering realistic values of different parameters. The analyzer is assumed to require a constant time, $\tau$, to check the input string in the database. Such an analyzer can be easily designed as a hash table, for example. A set of strings can be inserted into a hash table with collisions resolved by chaining the colliding strings together in a linked list. Such a hash table has an average of constant search time. This hash table can be stored in an off-chip commodity SRAM or SDRAM. Although the average search time in such a hash table can be made independent of the number of strings by using an ample memory, the string retrieval time from the memory depends on the length of the string. For a sub-string of length 32 bytes, for example, that is probed into the hash table maintained in an SRAM with a data bus width of 4 bytes, 8 clock cycles are required to retrieve the string and compare it against the input. With $L_{max}$ set to 32, even with an assumption of one collision and accounting for memory access latencies, a hash probe should require no more than 20 clock cycles, for example. Hence, $\tau=20/F$, i.e., 20 times the system clock period, is used.

Since the frequency of occurrence of the strings being looked for in the streaming data is typically very low, small values of p can be assumed. The values, p=0.001 (i.e., on an average for every thousand characters scanned, one string of interest is found) is assumed for this example. Considering the values, B=24 (hence, signatures of 24 distinct lengths can be scanned), F=100 MHz (which is typically the speed at which FPGAs and commodity SRAMs and SDRAMs operate), and G=4 (i.e., 4 Bloom filter engines are used in parallel), and substituting these values in equation (10) we obtain the following expression throughout:

$$R_4 = \frac{3.2}{1920 \times f + 1.019} \text{ Gigabits/s} \qquad (11)$$

Since the false positive probability of all the Bloom filters of an engine is engineered to be the same, say f, using equation (3):

$$f_i = f = \left(\frac{1}{2}\right)^{\left(\frac{m_i}{n_i}\right)\ln 2} \forall i \in [1 \ldots B] \qquad (12)$$

This implies that:

$$\frac{m_1}{n_1} = \frac{m_2}{n_2} = \ldots = \frac{m_B}{n_B} = \frac{\sum_{i=1}^{B} m_i}{\sum_{i=1}^{B} n_i} = \frac{M/G}{N} \qquad (13)$$

Therefore, $$f = \left(\frac{1}{2}\right)^{\left(\frac{M/G}{N}\right)\ln 2} \qquad (14)$$

where $f_i$ is a false positive probability of the $i^{th}$ Bloom filter within an engine; $m_i$ is the memory allocated to Bloom filter I; $n_i$ is the number of strings stored in Bloom filter; M is the total amount of on-chip memory available for Bloom filters of all G engines. Hence, each engine is allocated M/G amount of memory, which is shared by B Bloom filters in it. N is the total number of strings being stored in the Bloom filters of an engine. Thus, $$N = \sum_{i=1}^{B} n_i$$

Figure 4:
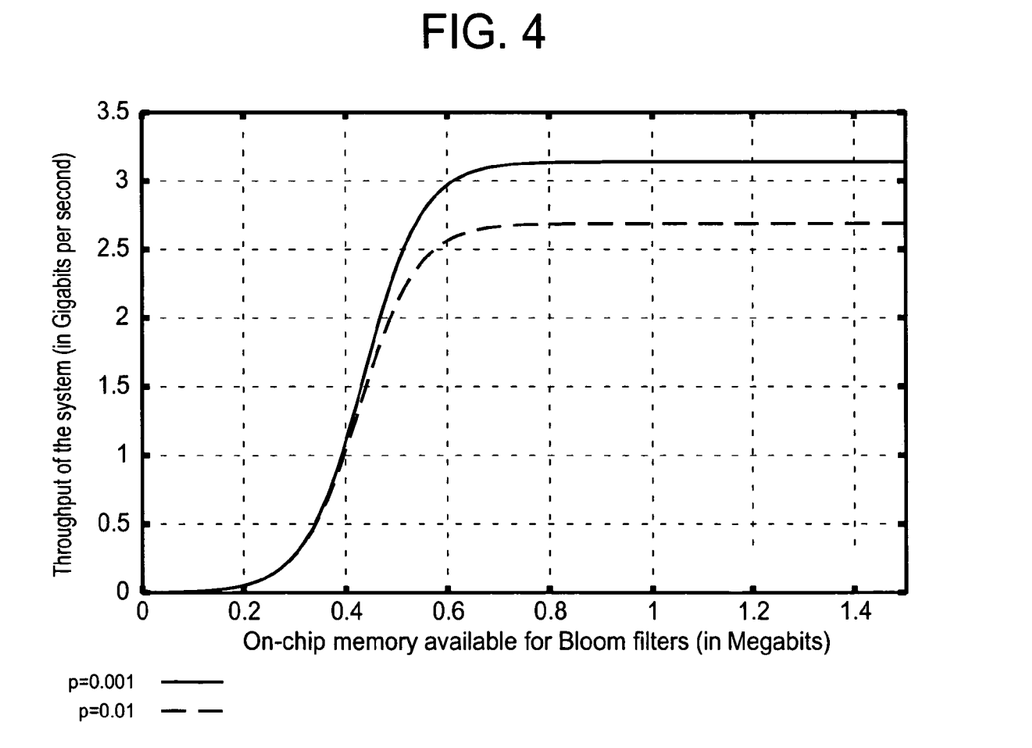
FIG. 4 is a graph showing the throughput of the present system as a function of the available on-chip memory, according to one embodiment consistent with the present invention.

After substituting the value of f in expression (11) and plotting the value of the throughput $R_G$ for a total of N=10, 000 strings, the graph shown in FIG. 4 is obtained.

FIG. 4 shows the throughput of the system as a function of the available on-chip memory. Two different values of p, the probability of true occurrences of strings, are considered. The system is tuned for a total of N=10,000 strings of B=24 distinct lengths. The maximum string probability time in the analyzer is, for example, 20 times the clock period of the system with the clock frequency F being 100 MHz.

Thus, as FIG. 4 shows, the effect of false positives is dominant for small vales of memory, which results in a lower throughput. However, as the amount of memory increases, the throughput increases rapidly and saturates to over 3 Gbps. Thus, with merely 1 Megabit of on-chip memory, 10,000 strings can be scanned at the line rate of OC-48 (i.e., 2.4 Gbps). Moreover, the number of strings can be increased with a proportional increase in the memory.

Accordingly, for a fixed number of strings in a Bloom filter, the number of bits allocated to a member in a Bloom filter also decides the number of hash functions needed for that Bloom filter. For example, if 50 bits per member on an average (i.e., m/n=50) are allocated, then the number of hash functions need to be k≈50×0.7=35 and the false positive probability is $(\frac{1}{2})^{35} \approx 3 \times 10^{-11}$.

Although this scheme uses a considerable number of hash functions, implementing these in hardware is relatively inexpensive. A class of universal hash functions called $H_3$ have been found to be suitable for hardware implementation. It should be recalled that hash functions are generated for each filter. Hence, the total number of distinct hash functions needed is k×B for one engine. The following is the description of how this hash matrix is calculated.

For any $i^{th}$ byte represented as:

$$\text{byte}_i = <b_1^i, b_2^i, b_3^i, \ldots, b_8^i>$$

first the $l^{th}$ hash function $h_i^l$ on it is calculated as follows:

$$h_i^l = d_{i1}^l \cdot b_1^i \oplus d_{i2}^l \cdot b_2^i \oplus d_{i3}^l \cdot b_3^i \oplus \ldots d_{i8}^l \cdot b_8^i \qquad (15)$$

where $d^l_{ij}$ is a predetermined random number in the range [1 ... m], '•' is the logical AND operator and $\oplus$ is the logical XOR operator. Then the $l^{th}$ hash function over all the i bytes is calculated as:

$$H_i^l = H_{i-1}^l \oplus h_i^l \forall i \in [1 \ldots W] \forall l \in [1 \ldots k] \quad (16)$$

with $H_o^l = 1$. It can be observed that the hash functions are calculated cumulatively and hence the results calculated over the first i bytes can be used for calculating the hash function over the first i+1 bytes. This property of the hash functions results in a regular and less resource consuming hash function matrix.

Figure 5A:
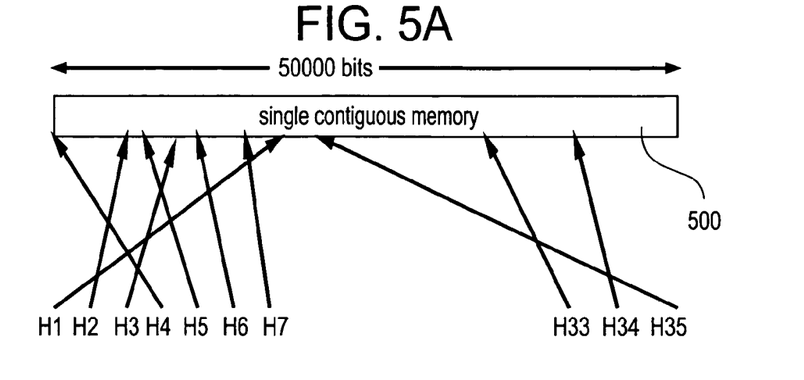
FIG. 5A is a schematic diagram of a Bloom filter with a single memory vector which allows 35 random lookups at a time, according to one embodiment consistent with the present invention.

Each hash function corresponds to one random lookup in the m-bit long memory array. Thus, for 35 hash functions, the Bloom filter memory should be able to support 35 random lookups every clock cycle. FIG. 5A illustrates a Bloom filter with single memory vector 500 which allows 35 random lookups at a time. Memories with such density and lookup capacity are realized by making use of the embedded Random Access Memories (RAMs) in the VLSI chip.

Figure 5B:
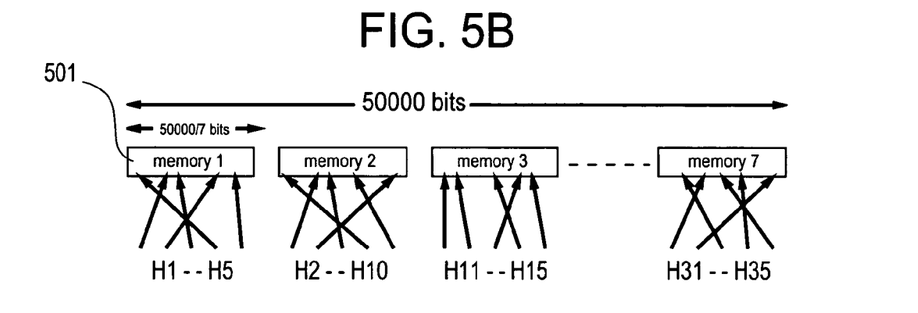
FIG. 5B is a schematic diagram of a Bloom filter implemented using multiple smaller memories with smaller lookup capacity to realize the desired lookup capacity, according to one embodiment consistent with the present invention.

With today's state-of-the-art VLSI technology, it is easy to fabricate memories that hold a few million bits. For embedded memories limited in their lookup capacity, a desired lookup capacity can be realized by employing multiple memories 501 with smaller lookup capacity (see FIG. 5B). For instance, state of the art memory cores may include five read-write ports. Hence, using this memory core, five random memory locations can be read in a single clock cycle. In order to perform 35 concurrent memory operations, seven parallel memory cores, each with $1/7^{th}$ the required array size, are needed (see FIG. 5B). Since the basic Bloom filter allows any hash function to map to any bit in the vector, it is possible that for some member, more than 5 hash functions map to the same memory segment, thereby exceeding the lookup capacity of this memory core. This problem can be solved by restricting the range of each hash function to a given memory. Thus, memory contention can be prevented.

In general, if h is the maximum lookup capacity of a RAM as limited by the technology then k/h such memories, each of size $m/_{(k/h)}$ can be combined to realize the desired capacity of m bits and k hash functions. Only h hash functions are allowed to map to a single memory. The false positive probability can be expressed as:

$$f' = \left[1 - \left(1 - \frac{1}{\frac{m}{k/h}}\right)^{hn}\right]^{(k/h)h} \approx \left(1 - e^{-\left(\frac{nk}{m}\right)}\right)^k \quad (17)$$

Comparing equation (17) with equation (1), it can be seen that restricting the number of hash functions mapping to a particular memory has negligible effect on the false positive probability.

From the above, it has been so far assumed that the distribution of the strings of different lengths is fixed for a given system. However, an ASIC design optimized for a particular string length distribution will have sub-optimal performance if the distribution varies drastically. Inflexibility in allocating resources for different Bloom filters can lead to poor system performance.

Hence, the ability to support a string database of a certain size, irrespective of the string length distribution is a desirable feature of the present system. Instead of using the on-chip memory to build distribution-dependent memories of customized size, a number of small fixed-size Bloom filters (mini-Bloom filters) can be implemented.

Figure 6A:
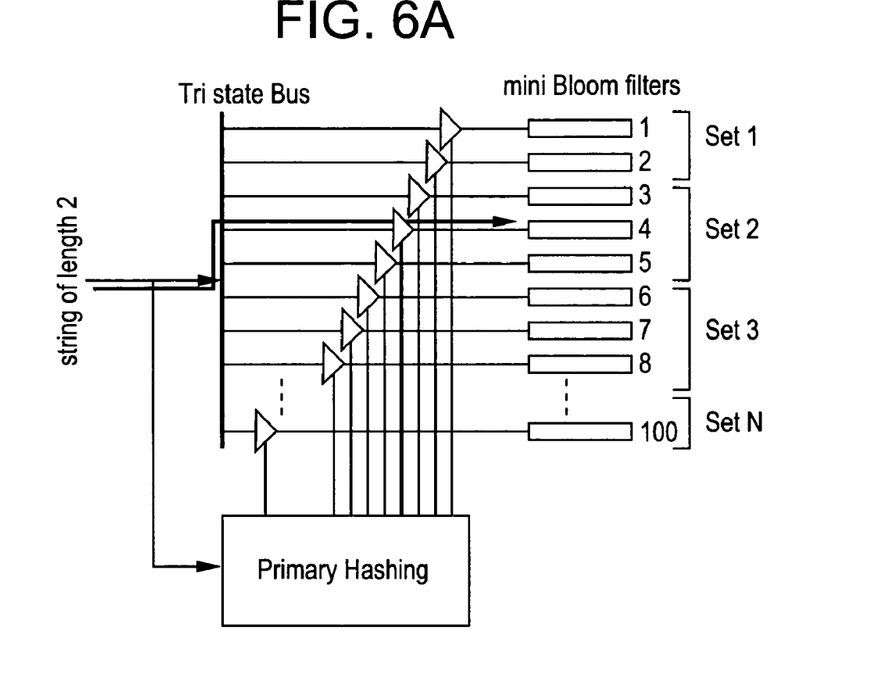
FIG. 6A is a schematic diagram showing the allocation of a plurality of mini-Bloom filters according to one embodiment consistent with the present invention.

Instead of allocating a fixed amount of memory to each of the Bloom filters, in one embodiment consistent with the present invention, multiple mini-Bloom filters are allocated to each Bloom filter. In other words, on-chip resources to individual Bloom filters are allocated in units of mini-Bloom filters instead of bits. Thus, if strings of length i are twice as many compared to the strings of length j, then a string set of length i is allocated twice the number of mini-Bloom filters compared to the string set of length j. While building the database, strings of a particular length are uniformly distributed into the set of mini-Bloom filters allocated to it, but each string is stored in only one mini-Bloom filter. This uniform random distribution of strings within a set of mini-Bloom filters can be achieved by calculating a primary hash over the string. The string is stored in the mini-Bloom filter pointed to by this primary hash value, within the set, as illustrated in FIG. 6A, where a string of length 2 is programmed in "set 2" mini-Bloom filter 4.

Figure 6B:
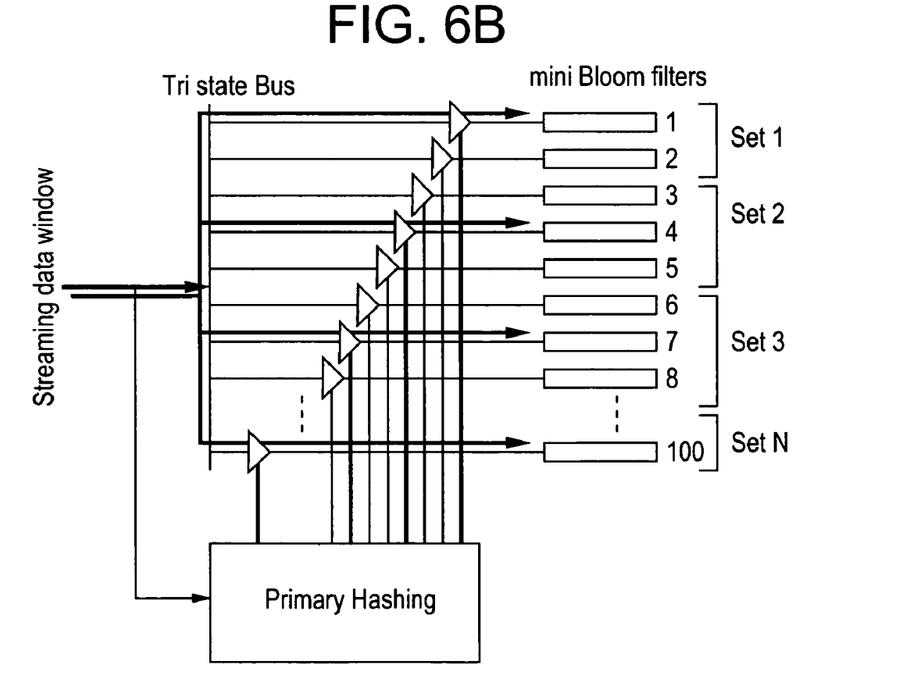
FIG. 6B is a schematic diagram showing the querying of different sub-strings in a streaming data window across sets of mini-Bloom filters, according to one embodiment consistent with the present invention.

In the query process in one embodiment consistent with the present invention, the streaming data window is broadcast to all sets of mini-Bloom filters. However, the same primary hash function is calculated on the sub-strings to find out which one of the mini-Bloom filters within the corresponding set should be probed with the given sub-string. This mechanism ensures that each sub-string to be looked up is used to probe only one mini-Bloom filter within a set dedicated for a particular string length (see FIG. 6B, where 1 mini-Bloom filter per set is probed).

Each string is hashed or probed into only one of the mini-Bloom filters of any set. Thus, the aggregate false positive probability of a particular set is the same as the false positive probability of an individual mini-Bloom filter. The false positive probability of the new system remains unchanged if the average memory bits per string in the mini-Bloom filter is the same as the average memory bits per string in the original scheme.

The importance of this scheme is that the allocation of the mini-Bloom filters for different string lengths can be changed unlike in the case of hardwired memory. The tables which indicate the string length set and its corresponding mini-Bloom filters can be maintained on-chip with reasonable hardware resources. The resource distribution among different sets can be reconfigured by updating these tables. This flexibility makes the present invention independent of string length distribution.

In one embodiment, the present invention is implemented in a Field Programmable Gate Array (FPGA), for example, a Xilinx XCV2000E, on the Field Programmable Port Extender (FPX) platform. In this example, single size signatures (hence B=1) of 32 bytes were used to detect the transfer of media files over the network.

In this example, the XCV2000E FPGA has 160 embedded block memories, each of which can be configured as single bit wide, 4096 bit long array that can perform two read operations using dual ports in a single clock cycle. The memory was used to construct a Bloom filter, with m=4096 and k=2. Using equations (2) and (3), it can be seen that this block RAM can support n=(m/2)×ln2≈1434 signatures with a false positive probability $\frac{1}{2}^2=0.25$. By employing 5 such block RAMs in this example, a mini-Bloom filter with string capacity 1434 and false positive probability of $f=\frac{1}{2}^{10}$ can be constructed. Using 35 block RAMs, 7 such mini-Bloom filters can be constructing giving an aggregate capacity of 1434×7=10038 strings. These mini-Bloom filters constitute one engine. Four parallel engines, for example, can be instantiated (which together consume 35×4=140 block RAMs) to push 4 bytes in a single clock cycle (hence, G=4). Substituting these values in equation (10), it can be seen that the throughput of over 2.46 Gbps, which corresponds to a line rate of OC-48, can be achieved.

Figure 7:
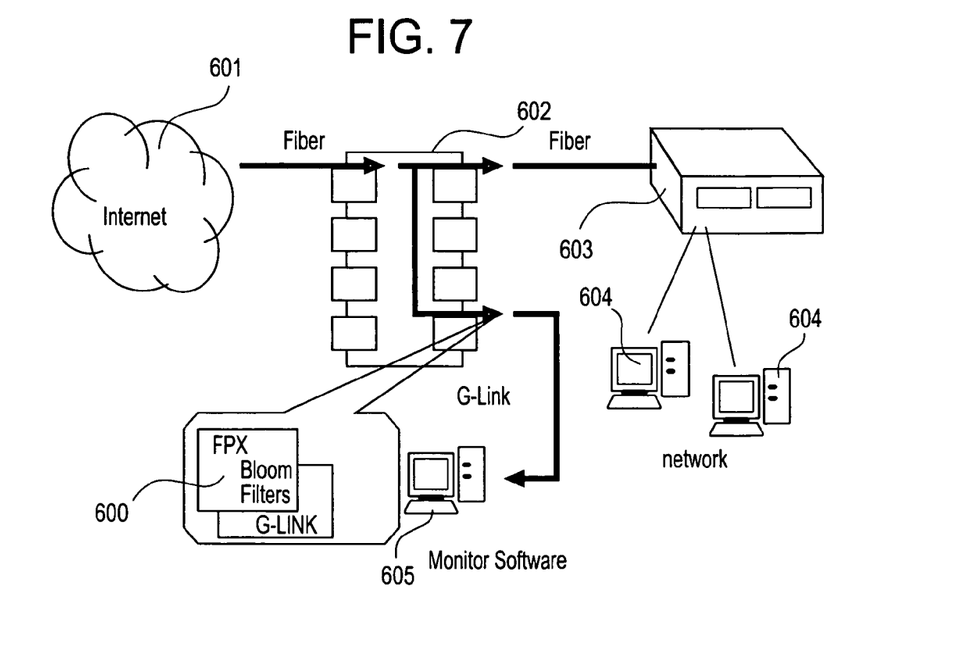
FIG. 7 is a schematic diagram showing the hardware implementation of one embodiment consistent with the present invention.

In one example of a system consistent with one embodiment of the present invention, an FPGA 600 with a single Bloom filter engine is implemented as shown in FIG. 7. The single Bloom filter engine consumed 35 block RAMs and only 14% of the available logic resources on the FPGA 600. The system operated at 81 MHz. Traffic from the Internet 601 passes through WUGS-20 602, a gigabit switch, where the data is multicast to an FPX 600 and to a router 603. The router 603 contains a Fast Ethernet blade to which the workstations 604 connect. Data from the workstations 604 pass to the router 603 then to the Internet 601 through the WUGS-20 602. Traffic coming from the Internet 601 to the router 602 is processed in the FPX 600. The analyzer was replaced by a computer program process in a standalone workstation 605, for example, that checks all packets marked as a possible match by the Bloom filters in the FPX 600.

Figure 8:
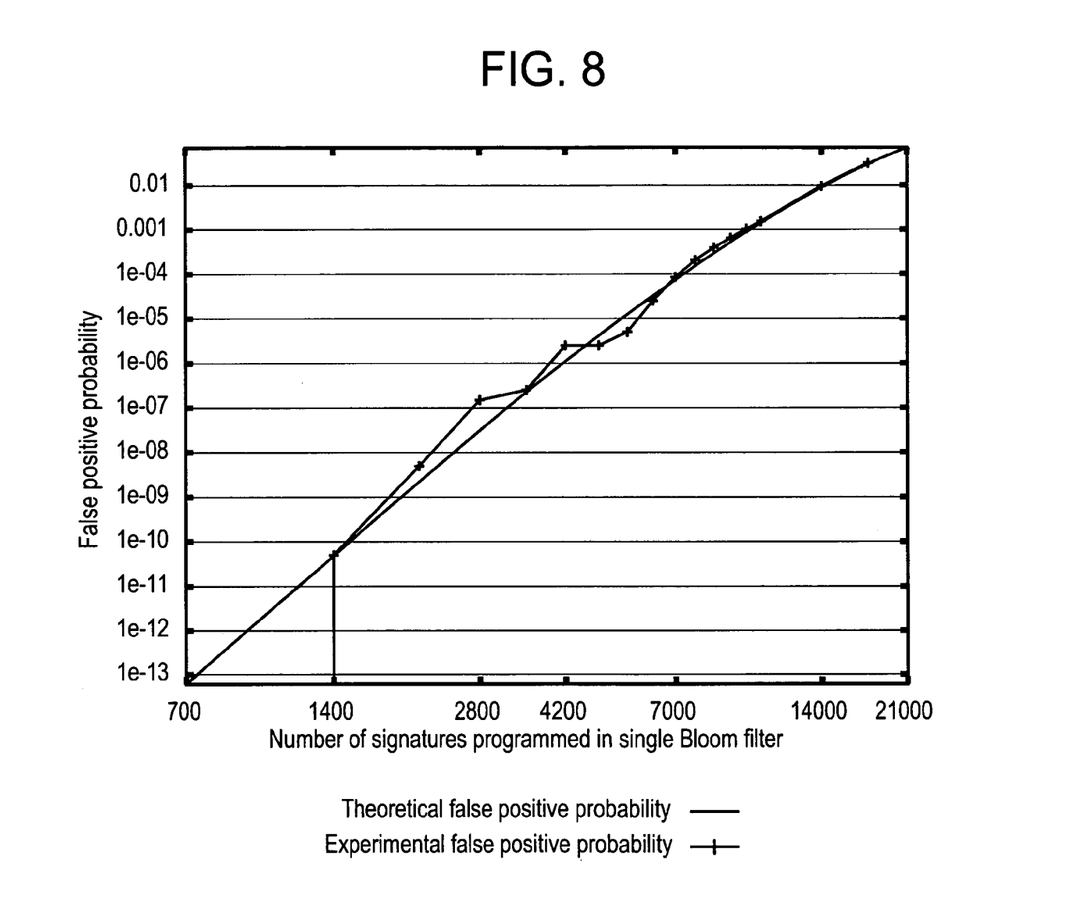
FIG. 8 is a graph showing the false positive probability as a function of the number of signatures stored into one Bloom filter engine, according to one embodiment consistent with the present invention.

In this example, experiments were performed to observe the practical performance of Bloom filters in terms of the false positive rate. The Bloom filters were programmed with a different number of strings and the false positives were measured. FIG. 8 shows the result of the false positive probability as a function of the number of signatures stored in one Bloom filter engine. FIG. 8 shows that the experimental results are consistent with the theoretical predictions. Note that in the present experiments, the system did not produce any false positives for strings less than 1400 (with approximately 200 strings in each mini-Bloom filter) and hence a dip can be seen in the curve.

To determine throughput for this particular prototype configuration, traffic was sent to the WUGS-20 switch 602 at a fixed rate and then recycled in the switch 602 to generate traffic at speeds above 1 Gbps. Using a single match engine, the circuit scanned data at the rates up to 600 Mbps. In contrast, the Bloom filter-based system is able to a handle a larger database with reasonable resources, and supports fast updates to the database. The latter is an important feature in network intrusion detection system which require immediate action to certain attacks like an Internet-worm outbreak.

Thus, the present invention detects for the presence of predefined strings in a packet payload at wire speeds. The present invention is based on the hardware implementation of Bloom filters. Constant time computation of the algorithm along with the scalability of Bloom filters makes it an attractive choice for applications such as network intrusion detection which require real time processing. An FPGA-based implementation in a Xilinx Virtex 2000E FPGA on an FPX platform, for example, could support 10,000 strings, and further generations of ASICS or FPGAs could check for millions of strings. Multiple Bloom filter engines in parallel can handle line speeds of 2.4 Gbps (OC-48) with the exemplary FPX infrastructure.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method for detecting a predefined signature in a network packet payload, said packet constituting traffic on a digital network, said method comprising the steps of:
   storing said predefined signature in at least one of a plurality of Bloom filters, said predefined signature comprising a string of bytes, said string having a predetermined length;
   monitoring a data stream on the network;
   receiving from the data stream a string having said predetermined length;
   membership testing said received string for an indication of membership in a Bloom filter; and
   testing for a false positive indication of membership.

2. The method according to claim 1, wherein each of said Bloom filters contains at least one predefined signature.

3. The method according to claim 2, wherein said indication of membership comprises a correspondence between said received string and said predefined signature.

4. The method according to claim 3, wherein said step of testing for a false positive comprises using an analyzer to determine whether said indication of membership is a false positive.

5. The method according to claim 4, wherein when said received string matches a predefined signature, an appropriate action is taken on said received string.

6. The method according to claim 5, wherein said appropriate action comprises at least one of dropping a network packet containing the received string, forwarding said network packet, and logging said network packet.

7. The method according to claim 4 wherein a plurality of received strings are monitored in a window of a predetermined number of bytes to achieve a number of received sub-strings, and said received sub-strings are verified for membership in said Bloom filters.

8. The method according to claim 7, wherein, when multiple received sub-strings are verified for membership within said window, the longest sub-string among said multiple received sub-strings is considered first in order down to the shortest sub-signature until verification of membership of one of said sub-signatures in one of said Bloom filters is obtained by said analyzer.

9. The method according to claim 2, wherein said plurality of Bloom filters constitute an engine, and a plurality of predefined signatures are grouped according to length and stored in said engine.

10. The method according to claim 9, wherein said data stream arrives at a rate of one byte per clock cycle for said engine.

11. The method according to claim 10, wherein each of said Bloom filters is tested for membership once per clock cycle.

12. The method according to claim 10, wherein said membership is verified in a single clock cycle.

13. The method according to claim 12, wherein, after membership of the received string is tested in said Bloom filters, said network data stream advances by one byte.

14. The method according to claim 2, wherein said plurality of Bloom filters constitute a plurality of parallel engines, each said engine coupled to a corresponding one of a plurality of analyzers.

15. The method according to claim 14, wherein each said engine advances said network data stream by a corresponding number of bytes.

16. The method according to claim 4, wherein said analyzer comprises a hash table of signatures.

17. The method according to claim 16, wherein a set of received strings is inserted into said hash table, with collisions resolved by chaining colliding received strings together in a linked list.

18. The method according to claim 17, wherein a number of bits allocated to a membership of said received string in a Bloom filter decides a number of hash functions needed for said Bloom filter.

19. The method according to claim 18, wherein each of said hash functions corresponds to one random lookup in an m-bit long memory array.

20. The method according to claim 16, wherein said hash table is one of an off-chip commodity SRAM and a SDRAM.

21. The method according to claim 16, wherein said Bloom filters are counting Bloom filters each of which maintains a vector of counters corresponding to each bit in a bit vector.

22. The method according to claim 21, wherein said counters are maintained in software and a bit corresponding to each of said counters is maintained in hardware.

23. The method according to claim 9, wherein a plurality of said engines are employed to increase throughput by a multiple of a quantity of said engines.

24. The method according to claim 23, wherein said throughput is greater than 2.4 Gbps.

25. The method according to claim 9, wherein a set of multiple mini-Bloom filters is allocated to each Bloom filter.

26. The method according to claim 25, further comprising: uniformly distributing said predefined signatures into said set of said mini-Bloom filters.

27. The method according to claim 26, wherein each of said predefined signatures is stored in only one of said mini-Bloom filters.

28. The method according to claim 27, wherein said uniform distribution is achieved by calculating a primary hash over each of said predefined signatures.

29. The method according to claim 28, wherein said primary hash is calculated on network sub-strings from said data stream to determine which of said mini-Bloom filters within said set should be probed for membership of said network sub-string.

30. The method according to claim 29, wherein each of said network sub-strings is used to probe only one of said mini-Bloom filters within said set dedicated for a particular string length.

31. The method according to claim 1, wherein said membership testing is performed on each received string of every predetermined length in every packet.

32. The method according to claim 1, wherein no false negatives are obtained.

33. The method according to claim 1, wherein said data stream comprises TCP/IP data.

34. The method according to claim 1, wherein at least one of said Bloom filters utilizes an embedded memory.

35. The method according to claim 34, wherein a retrieval time from said memory of said predefined signature depends on said predetermined length.

36. The method according to claim 34, wherein multiple memories are used to create each of said Bloom filters, and no more than a restricted number of hash functions map to a particular memory.

37. The method according to claim 34, wherein increasing a size of said embedded memory enables a proportional increase in a number of received strings.

38. The method according to claim 34, wherein said embedded memory is an embedded RAM in a VLSI chip.

39. The method according to claim 1, wherein said Bloom filters are implemented in an FPGA.

40. An apparatus for detecting a predefined signature in a network packet payload, said packet constituting traffic on a digital network, said apparatus comprising:
    means for storing said predefined signature in at least one of a plurality of Bloom filters, said predefined signature comprising a string of bytes, said string having a predetermined length;
    means for monitoring a data stream on the network;
    means for receiving from the data stream a string having an apparent correspondence to said predefined signature; and
    means for determining, using an analyzer, whether said apparent correspondence is a false positive.

41. An apparatus for detecting predefined signatures in packet payload traffic on a digital network, the apparatus comprising:
    an FPGA having a plurality of embedded block memories for storm said predefined signatures, said FPGA being used to construct a plurality of Bloom filters, and said FPGA being disposed on a platform;
    a switch adapted to multicast data in a data stream from the network to a router, wherein traffic from the network to said router is processed in said FPGA; and
    a monitor adapted to check all packets marked as containing a possible match to at least one of said predefined signatures stored in said Bloom filters.

42. The apparatus of claim 41, wherein said FPGA comprises embedded memories.

43. The apparatus according to claim 42, wherein said embedded memories are embedded RAMs in a VLSI chip.

44. The apparatus according to claim 43, wherein said plurality of Bloom filters comprise at least one set of parallel Bloom filters and each set of parallel Bloom filters comprises an engine adapted to increase throughput by a multiple of a quantity of said engines.

45. The apparatus according to claim 44, wherein said throughput is greater than 2.4 Gbps.

46. The apparatus according to claim 41, wherein said monitor is an analyzer.

47. The apparatus according to claim 46, wherein said analyzer comprises a table of hashed signatures.

48. The apparatus according to claim 47, wherein said hash table is one of an off-chip commodity SRAM and a SDRAM.

49. The apparatus according to claim 41, wherein said monitor comprises a computer.

50. The apparatus according to claim 41, wherein said Bloom filters are counting Bloom filters each adapted to maintain a vector of counters corresponding to each bit in a bit vector.

51. The apparatus according to claim 50, wherein said counters are maintained in software and a bit corresponding to each of said counters is maintained in hardware.

52. The apparatus according to claim 41, wherein a set of multiple mini-Bloom filters is allocated to each of said Bloom filters.

53. The apparatus according to claim 52, wherein said predefined signatures are uniformly distributed into said set of said mini-Bloom filters.

54. The apparatus according to claim 53, wherein each of said predefined signatures is stored in only one of said mini-Bloom filters.

55. The apparatus according to claim 54, wherein said uniform distribution is achieved by calculating a primary hash over each of said predefined signatures.

56. The apparatus according to claim 55, wherein said primary hash is calculated on network sub-strings from said data stream to determine which of said mini-Bloom filters within said set should be probed for membership of said network sub-string.

57. The apparatus according to claim 56, wherein each of said network sub-strings is used to probe only one of said mini-Bloom filters within said set dedicated for a particular string length.

* * * * *

UNITED STATES PATENT AND TRADEMARK OFFICE
CERTIFICATE OF CORRECTION

| | | |
|---|---|---|
| PATENT NO. | : 7,444,515 B2 | Page 1 of 1 |
| APPLICATION NO. | : 10/640513 | |
| DATED | : October 28, 2008 | |
| INVENTOR(S) | : Sarang Dharmapurikar et al. | |

It is certified that error appears in the above-identified patent and that said Letters Patent is hereby corrected as shown below:

Column 14, line 7: "for storm" should be --for storing--

Signed and Sealed this

Third Day of November, 2009

David J. Kappos
*Director of the United States Patent and Trademark Office*